(12) United States Patent
Thesling

(10) Patent No.: US 8,625,659 B2
(45) Date of Patent: Jan. 7, 2014

(54) RECEIVER-BASED FREQUENCY RESPONSE ESTIMATION

(75) Inventor: William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 857 days.

(21) Appl. No.: 11/972,017

(22) Filed: Jan. 10, 2008

(65) Prior Publication Data

US 2009/0180573 A1    Jul. 16, 2009

(51) Int. Cl.
*H04B 1/38* (2006.01)
*H04L 5/16* (2006.01)

(52) U.S. Cl.
USPC ............ 375/219; 375/296; 375/344; 375/358

(58) Field of Classification Search
USPC .......... 375/219, 296, 344, 358; 374/219, 296, 374/344, 358
See application file for complete search history.

(56) References Cited

U.S. PATENT DOCUMENTS

| | | | | |
|---|---|---|---|---|
| 5,533,065 | A * | 7/1996 | Blaker et al. | 375/341 |
| 5,943,606 | A * | 8/1999 | Kremm et al. | 455/12.1 |
| 6,240,124 | B1 * | 5/2001 | Wiedeman et al. | 375/130 |
| 6,507,602 | B1 * | 1/2003 | Dent | 375/142 |
| 7,221,701 | B2 * | 5/2007 | Arikan et al. | 375/148 |
| 7,599,420 | B2 * | 10/2009 | Forenza et al. | 375/141 |
| 2003/0179830 | A1 * | 9/2003 | Eidson et al. | 375/296 |
| 2003/0203737 | A1 * | 10/2003 | Jarett | 455/450 |
| 2004/0047435 | A1 * | 3/2004 | Su | 375/316 |
| 2004/0252632 | A1 * | 12/2004 | Bourdoux et al. | 370/210 |
| 2004/0259497 | A1 * | 12/2004 | Dent | 455/13.3 |
| 2005/0129137 | A1 * | 6/2005 | Yamada et al. | 375/267 |
| 2005/0152387 | A1 * | 7/2005 | Utsunomiya et al. | 370/431 |
| 2006/0227885 | A1 | 10/2006 | Thesling | |
| 2006/0293882 | A1 | 12/2006 | Giesbrecht et al. | |
| 2007/0153884 | A1 * | 7/2007 | Balasubramanian et al. | 375/221 |
| 2008/0056189 | A1 * | 3/2008 | Hudson et al. | 370/330 |
| 2009/0103666 | A1 * | 4/2009 | Zhao et al. | 375/341 |
| 2010/0128823 | A1 * | 5/2010 | Sasaoka et al. | 375/343 |

OTHER PUBLICATIONS

International Search Report dated Feb. 4, 2009, International Application No. PCT/US2008/086012, filed Dec. 9, 2008, 2 pages.

* cited by examiner

*Primary Examiner* — Shuwang Liu
*Assistant Examiner* — Sung Ahn
(74) *Attorney, Agent, or Firm* — Holland & Hart LLP

(57) ABSTRACT

Methods, systems, and devices are described for estimating a frequency response using a received signal. A first spectral estimation is performed on a digitized representation of an initial version of a wireless signal. A second spectral estimation is performed on the digitized representation of the wireless signal as received from the transmitter. The first spectral estimation is compared with the second spectral estimation to estimate a frequency response. A later signal transmitted from the transmitter may be pre-distorted to compensate for the estimated frequency response. The disclosed frequency response estimation techniques may be used in a satellite communications system.

13 Claims, 8 Drawing Sheets

RECEIVER-BASED FREQUENCY RESPONSE ESTIMATION

BACKGROUND

The present invention relates to wireless communications in general and, in particular, to broadband satellite communications.

In wireless communication links, issues at the transmitter and in the channel can have an adverse impact on communication signals. Particularly in various broadband signals, there may be a varied or inconsistent frequency response. This response may result in significant tilt, ripple, and varied group delay impacting the received signal. It may, therefore, be beneficial to identify novel ways to estimate the frequency response at a receiver, so that these effects may be compensated for or otherwise addressed in later transmissions.

SUMMARY

Methods, systems, and devices are described for estimating a frequency response using a received signal. In one embodiment, a first spectral estimation is performed on a digitized representation of an initial version (e.g., an "as transmitted" or "pre-transmission" version) of a wireless signal. A second spectral estimation is performed on the digitized representation of the wireless signal as received from a transmitter. The first spectral estimation is compared with the second spectral estimation to estimate a frequency response.

In one set of embodiments, the frequency response is estimated at a receiver. A sequence of symbols made up of a digitized representation of a wireless signal received from a transmitter is buffered. The buffered sequence of symbols is decoded to recover a set of data. A version of the wireless signal is regenerated using the recovered set of data. A spectral estimate for the buffered sequence of symbols is compared to a spectral estimate for the regenerated version to estimate a frequency response. In some embodiments, a later signal transmitted from the transmitter may be pre-distorted to compensate for the estimated frequency response.

The disclosed frequency response estimation techniques may be used in a satellite communications system. Such a system may include a subscriber terminal configured to receive a first wireless signal transmitted from a gateway device via a satellite. The subscriber terminal buffers a digitized representation of the first wireless signal, made up of a sequence of symbols. The subscriber terminal may decode the sequence of symbols to recover a set of data. The subscriber terminal may then compare a first spectral estimate generated from the buffered sequence of symbols to a second spectral estimate generated from the recovered set of data to create comparison data.

The comparison data may be transmitted from the subscriber terminal to the gateway device. The gateway device may receive the comparison data, and pre-distort a second signal to be transmitted based in part on the comparison data.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Methods, systems, software, and devices are described for estimating a frequency response using a received signal. In certain embodiments, a first spectral estimation is performed on a digitized representation of an initial version of a wireless signal. A second spectral estimation is performed on the digitized representation of the wireless signal as received from the transmitter. The first spectral estimation is compared with the second spectral estimation to estimate a frequency response. A later signal to be transmitted may be pre-distorted to compensate for the estimated frequency response.

The following description provides example embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, devices, and software may individually or collectively be components of a larger system, wherein other procedures may take precedence over or otherwise modify their application. Also, a number of steps may be required before, after, or concurrently with the following embodiments.

Figure 1:
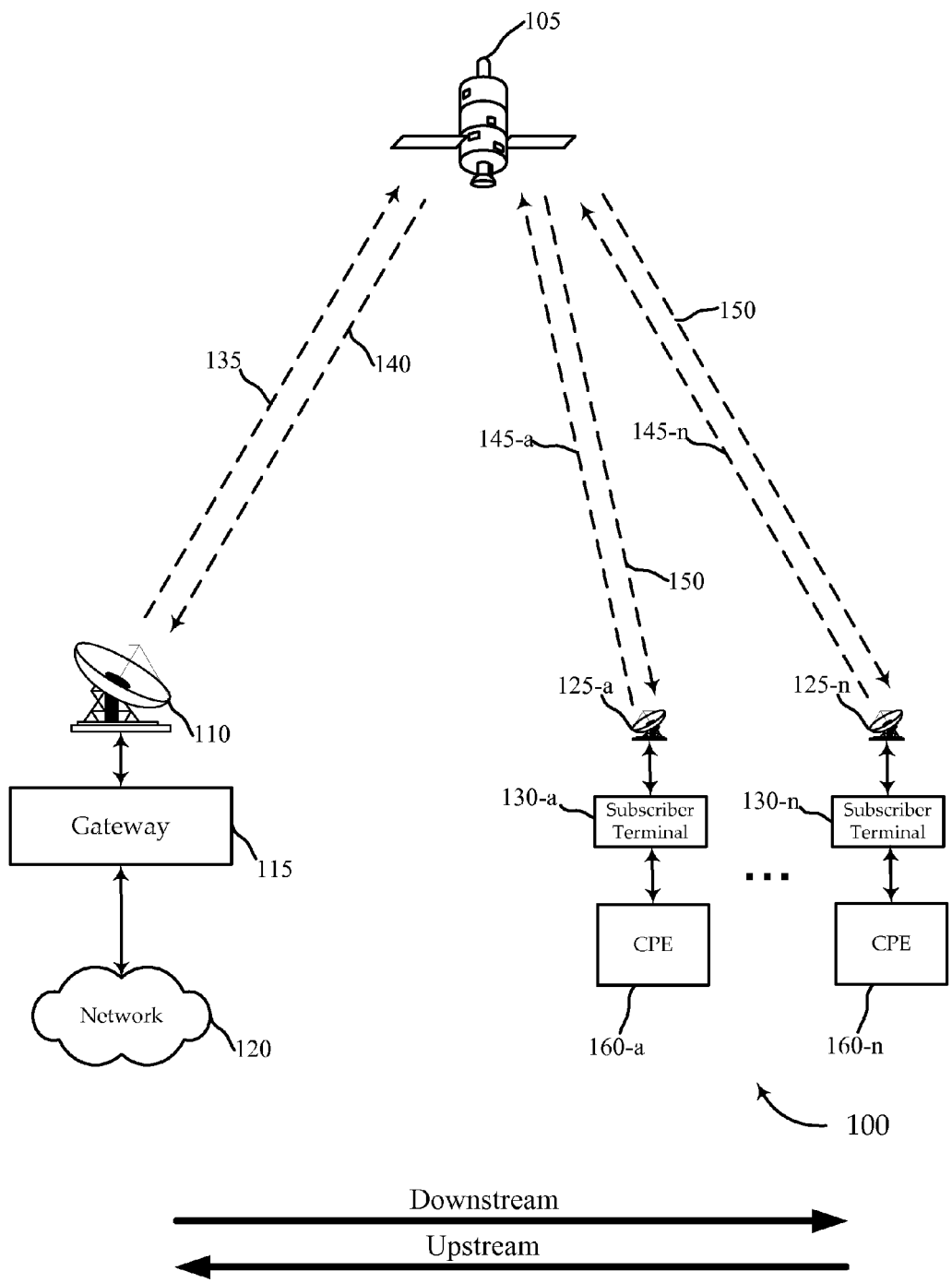
FIG. 1 is a block diagram of a satellite communications system configured according to various embodiments of the invention.

Referring first to FIG. 1, a block diagram illustrates an example satellite communications system 100 configured to estimate a frequency response according to various embodiments of the invention. While a satellite communications system is used to illustrate various aspects of the invention, it is worth noting that certain principles set forth herein are applicable to a number of other wireless systems, as well. The satellite communications system 100 includes a network 120, such as the Internet, interfaced with a gateway 115 that is configured to communicate with one or more subscriber terminals 130, via a satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. The network may connect the gateway 115 with other gateways (not pictured) and/or the subscriber terminals 130, and thus information on link conditions, frequency response, and other network metrics may be shared via satellite or other communication channels.

The gateway 115 provides an interface between the network 120 and the subscriber terminals 130. The gateway 115 may be configured to receive data and information directed to one or more subscriber terminals 130, and format the data and information (e.g., using Adaptive Coding and Modulation (ACM)) for delivery downstream to the respective subscriber terminals 130 via the satellite 105. Similarly, the gateway 115 may be configured to receive upstream signals from the satellite 105 (e.g., from one or more subscriber terminals 130) directed to a destination in the network 120, and can format the received signals for transmission through the network 120.

A device (not shown) connected to the network 120 may, therefore, communicate with one or more subscriber terminals 130 through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the DVB-S2 and WiMAX standards. In a number of embodiments, the gateway 115 utilizes ACM in conjunction with one or more of the traffic control and shaping techniques described herein to direct traffic to the individual terminals. The gateway 115 may use a broadcast signal, with a modulation and coding (modcode) format adapted for each packet to the link conditions of the subscriber terminal 130 or set of terminals 130 to which the packet is directed (e.g., to account for the variable service link 150 conditions from the satellite 105 to each respective terminal 130).

The gateway 115 may use an antenna 110 to transmit the signal to the satellite 105. In one embodiment, the antenna 110 is a parabolic reflector with high directivity in the direction of the satellite and low directivity in other directions. The frequency response (e.g., tilt, ripple, group delay variations, etc.) may occur in the gateway 115 and/or antenna 110, or in other parts of the channel.

The downstream signals 135, 150 may include, for example, one (or more) single carrier signals. Each single carrier signal may be divided in time (e.g., using TDMA or other time division multiplexing techniques) into a number of sub-channels. The sub-channels may be the same size, or different sizes, and a range of options will be addressed below. In some embodiments, other channelization schemes may be integrated with or used in place of time-divided sub-channels, such as Frequency Division Multiple Access (FDMA), Orthogonal Frequency Division Multiple Access (OFDMA), Code Division Multiple Access (CDMA), or any number of hybrid or other schemes known in the art.

The satellite 105 may process the signals received from the gateway 115 and transmit the signal from the gateway 115 to one or more subscriber terminals 130. The frequency response (e.g., tilt, ripple, group delay variations, etc.) may occur due to atmospherics, or in the satellite. In one embodiment, the satellite 105 operates in a multi-beam mode, transmitting a number of narrow beams, each directed at a different region of the earth, allowing for frequency re-use. With such a multibeam satellite 105, there may be any number of different signal-switching configurations on the satellite, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The service signals transmitted from the satellite 105 may be received by one or more subscriber terminals 130, via the respective subscriber antenna 125. In one embodiment, a subscriber terminal 130 compares a first spectral estimation on the digitized representation of the wireless signal as received with a second spectral estimation of the digitized representation of the wireless signal in "as-transmitted" form (e.g., estimated from a regenerated signal). The subscriber terminal 130 may compress this comparison data, and transmit it to the gateway 115. Filter coefficients used to pre-distort the signal to compensate for the frequency response may be generated back at the gateway 115, based on the comparison data. In other embodiments, however, the digitized representations of the wireless signal in either initial or received form may be processed to different degrees by the gateway 115 and the subscriber terminal 130.

For example, the gateway 115 may receive a digitized representation of a wireless signal (e.g., a version received at the subscriber terminal 130), and use the digitized representation in determining how to pre-distort downstream signals. The gateway 115 may perform a first spectral estimation on the digitized representation of the wireless signal as received, and a second spectral estimation on the digitized representation of the initial version of the wireless signal. A comparison may be performed, and data from the comparison may be used to pre-distort the signal to compensate for a frequency response.

In another embodiment, the gateway 115 may receive a set of filter coefficients (e.g., in compressed form) to be used to compensate for the estimated frequency response of signals transmitted downstream to one or more subscriber terminals 130. This received data may be generated at the subscriber terminals 130, or another intermediate device. The gateway 115 may then pre-distort a signal to be transmitted downstream using the received coefficients. Other processing distributions are possible, as well.

Turning again to the subscriber terminal 130, the antenna 125 and terminal 130 together may make up a very small aperture terminal (VSAT). In other embodiments, a variety of other types of antennas 125 may be used at the subscriber terminal 130 to receive the signal from the satellite 105. Each of the subscriber terminals 130 may be a single user terminal or, alternatively, be a hub or router (not pictured) that is coupled with multiple user terminals. Each subscriber terminal 130 may be connected to consumer premises equipment (CPE) 160 (e.g., computers, local area networks, Internet appliances, wireless networks, etc.). The frequency estimation techniques described herein may be used at any subset of the subscriber terminals 130, and data from a number of subscriber terminals 130 may be received and processed at the gateway 115.

In one embodiment, a subscriber terminal 130 may be configured to receive, digitize, and buffer a wireless signal transmitted from the gateway via a satellite. It may demodulate and decode a sequence of symbols of the digitized wireless signal to create a recovered set of data. The subscriber terminal 130 may regenerate a version of the signal using the recovered set of data. The subscriber terminal 130 may generate a first spectral estimate for the sequence of symbols of the digitized wireless signal, and generate a second spectral estimate for the regenerated version. It may compare the first spectral estimate and the second spectral estimate to generate comparison data. As used herein, the terms "compare" and "comparison" may include any ratio or other difference measurement (e.g., measuring phase or amplitude differences between the spectral estimate of the received signal versus the regenerated version). The subscriber terminal 130 may compress this data for transmission to the gateway. In other embodiments, more or less processing may be performed at the subscriber terminal 130 (e.g., the subscriber terminal 130 in some embodiments may simply transmit the received signal in digitized form, and allow the gateway 115 or other intermediate device to perform additional processing).

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. A number of frequency channels are allocated which may be fixed, or which may be allocated in a more dynamic fashion. A Time Division Multiple Access (TDMA) scheme is then employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as TDMA, FDMA, OFDMA, CDMA, or any number of hybrid or other schemes known in the art.

A subscriber terminal 130 may transmit information related to the received signal and any comparison data to the gateway 115 via the satellite 105, or via a landline or other connection. Other signal quality indicators may be used as well, such as a measured signal-to-noise ratio, an estimated signal-to-noise ratio, a bit error rate, a received power level, or any other communication link quality indicator, which may be compensated for, as well. The subscriber terminal 130 itself may measure the received signal, perform the spectral estimation, etc., or it may pass information measured or estimated to other devices.

A subscriber terminal 130 may also transmit data and information (e.g., received signal information, spectral estimations, or comparison data) to a network 120 destination via the satellite 105 and gateway 115. The subscriber terminal 130 may transmit the signals via the upstream uplink 145 to the satellite 105 using the antenna 125. A subscriber terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The gateway 115 may, in some embodiments, use this signal quality information to implement Adaptive Coding and Modulation (ACM), adjusting the modcode formats to each terminal or set of terminals based on their link conditions.

In one embodiment, a gateway 115 includes a Satellite Modem Termination System (SMTS), which is based at least in part on the Data-Over-Cable Service Interface Standard (DOCSIS). The SMTS in this embodiment includes a bank of modulators and demodulators for processing signals to be transmitted to or signals received from subscriber terminals 130. The SMTS in the gateway 115 performs the real-time scheduling of the signal traffic through the satellite 105, and provides the interfaces for the connection to the network 120. In other embodiments the scheduling operations may be performed by other components or devices employing other standards.

In this embodiment, the subscriber terminals 130 use portions of DOCSIS-based modem circuitry, as well. Therefore, DOCSIS-based resource management, protocols, and schedulers may be used by the SMTS for efficient provisioning of messages. DOCSIS-based components may be modified, in various embodiments, to be adapted for use therein. Thus, certain embodiments may utilize certain parts of the DOCSIS specifications, while customizing others.

While a satellite communications system 100 applicable to various embodiments of the invention is broadly set forth above, a particular embodiment of such a system 100 will now be described. In this particular example, approximately 2 gigahertz (GHz) of bandwidth is to be used, comprising four 500 megahertz (MHz) bands of contiguous spectrum. Employment of dual-circular polarization results in usable frequency comprising eight 500 MHz non-overlapping bands with 4 GHz of total usable bandwidth. This particular embodiment employs a multi-beam satellite 105 with physical separation between the gateways 115 and subscriber spot beams, and configured to permit reuse of the frequency on the various links 135, 140, 145, 150. A single Traveling Wave Tube Amplifier (TWTA) may be used for each service link spot beam on the downstream downlink, and each TWTA is operated at full saturation, or at an appropriate backoff, to maximize efficiency. A single wideband carrier signal, for example using one of the 500 MHz bands of frequency in its entirety, fills the entire bandwidth of the TWTA, thus allowing a reduced number of space hardware elements. Spotbeam size and TWTA power may be optimized to achieve maximum flux density on the earth's surface of −118 decibel-watts per meter squared per megahertz (dbW/m$^2$/MHz).

Figure 2:
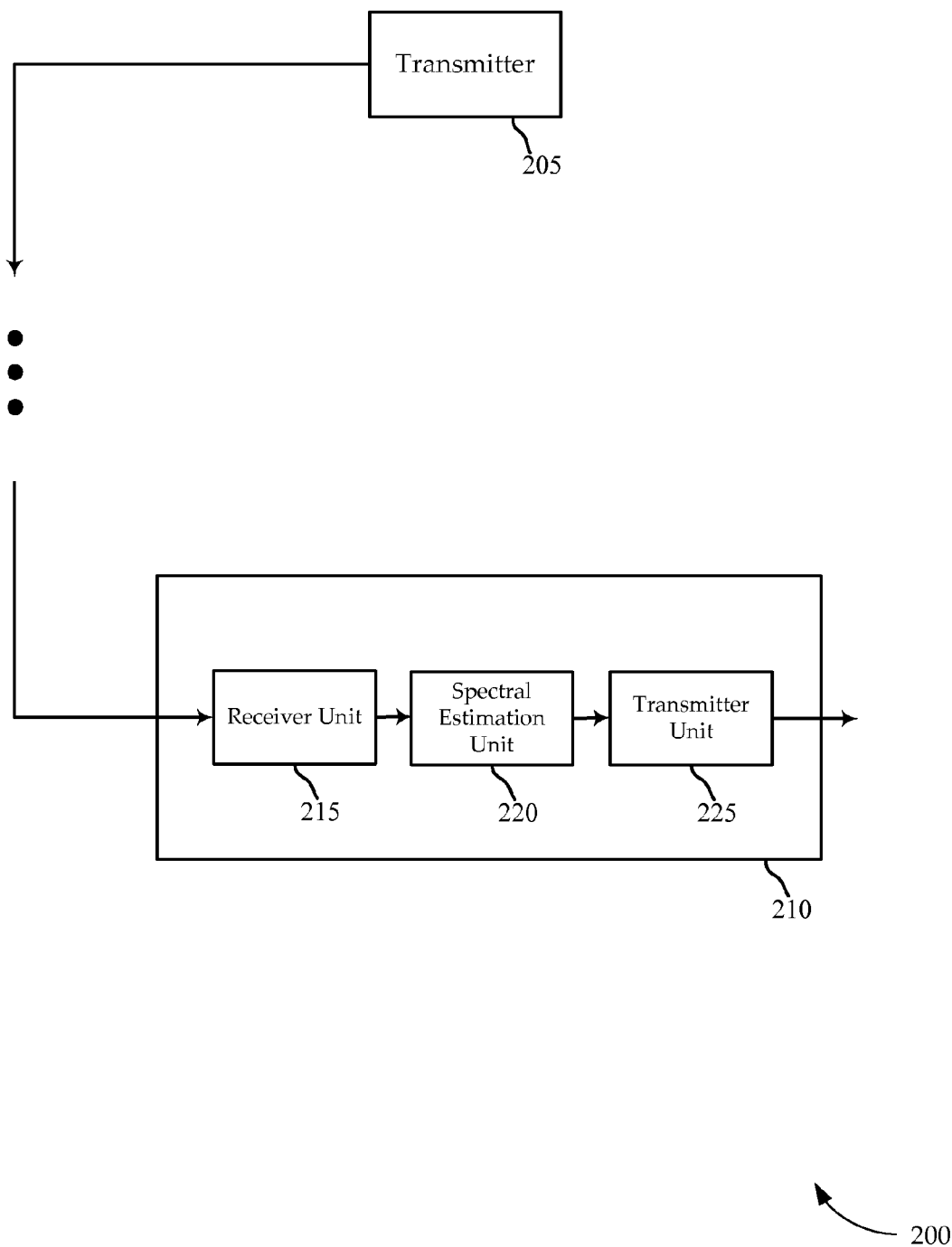
FIG. 2 is a block diagram of a device configured to estimate a frequency response according to various embodiments of the invention.

Referring next to FIG. 2, a block diagram is shown illustrating a system 200 configured according to one embodiment of the invention. The system 200 includes a transmitter device 205, which may be the gateway 115 of FIG. 1. In other embodiments, the transmitter may be any of a number of different devices configured to transmit wireless signals.

The system 200 also includes a receiver device 210, which may be any device configured to receive and process communication signals. The receiver device 210 may be a subscriber terminal 130 of FIG. 1, configured to be used by a subscriber, or configured as a terminal dedicated to measurement of the frequency response. In other embodiments, the receiver device 210 may be the gateway 115 itself, configured to receive and measure its own signals via the satellite. In still other embodiments, the receiver device 210 may receive processed signals forwarded from an intermediate receiver (e.g., to measure the frequency response between a transmitter 205 and an intermediate device).

In one embodiment, the receiver device 210 includes a receiver unit 215, a spectral estimation unit 220, and a transmitter unit 225. These units of the device 210 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

The receiver unit 215 may be configured to store a digitized representation of the wireless signal received from the transmitter 205, the stored signal made up of a sequence of symbols. The receiver unit 215 may be configured to generate the signal by digitizing a received wireless signal transmitted from the transmitter 205. Alternatively, the receiver unit 215 may receive and store an already digitized version of the wireless signal (e.g., when the digitized version is transmitted from an intermediate device).

The spectral estimation unit 220 may generate a first spectral estimate for a signal representative of the stored sequence of symbols. The spectral estimation unit 220 may also generate a second spectral estimate from a signal representative of the original data. This original data may be recovered by decoding the stored sequence of symbols to recover a set of data, and regenerating a version of the wireless signal using the recovered set of data. In other embodiments, the recovered set of data and/or the pre-transmission signal may be generated in other ways.

The first spectral estimate for the received signal may be obtained by using a fast Fourier transform to identify the signal amplitudes and/or phases at each of a number of analysis frequencies. The second spectral estimate, for the signal representative of the original data, may similarly be obtained by using a fast Fourier transform to identify the signal amplitudes and/or phases at each of a number of analysis frequencies. Other methods of spectral estimation (e.g., other forms of Fourier analysis) may be used, as well.

The spectral estimation unit 220 may compare the first spectral estimate to the second spectral estimate to generate comparison data. The comparison data may be one or more measurements of amplitude ratio and/or phase differences between the first spectral estimate and the second spectral estimate. As generally noted above, "comparison data" may include any ratio or other difference measurement. The transmitter unit 225 may transmit the comparison data (e.g., from the subscriber terminal 130 to the gateway 115). Alternatively, other components of the device (not shown) may use the comparison data in determining how to pre-distort a signal to be transmitted from the transmitter unit 225 (e.g., if a gateway 115 is performing the spectral estimation).

Figure 3:
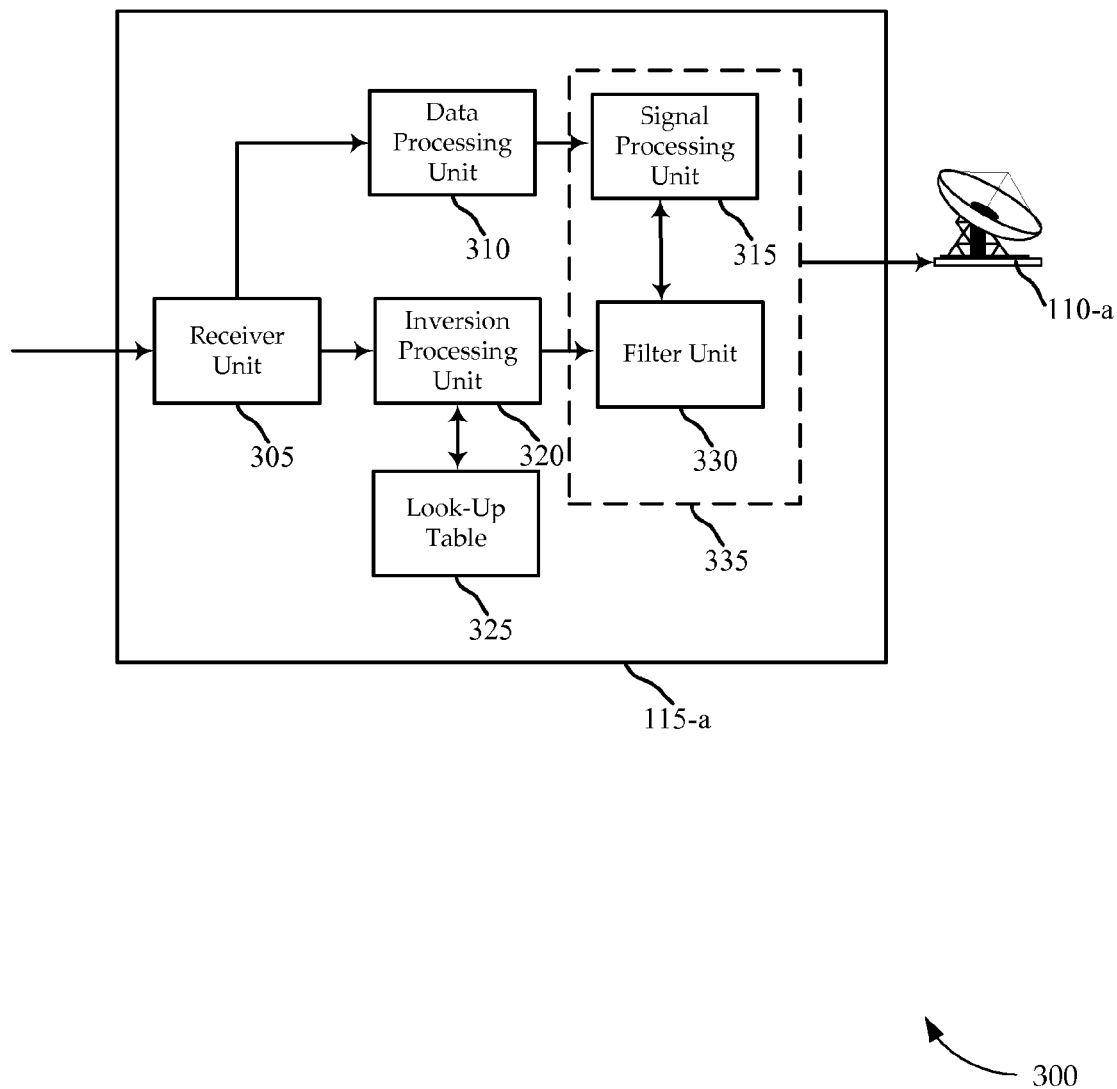
FIG. 3 is a block diagram of a gateway device configured according to various embodiments of the invention.

Referring next to FIG. 3, a block diagram is shown illustrating a gateway 115-a configured according to one embodiment of the invention. This may be the gateway described with reference to FIG. 1. The gateway 115-a includes a receiver unit 305, a data processing unit 310, an inversion processing unit 320, look-up table 325, and a transmitter unit 335. These units of the device 115-a may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory in the gateway 115-a, formatted to be executed by one or more general or application-specific processors.

In one embodiment, the frequency response estimation may be initiated when the transmitter unit 335 transmits data received from the data processing unit 310. The signal may be transmitted through antenna 110-a to a satellite (e.g., satellite 105), where it then may be processed and sent to one or more subscriber terminals 130. During the transmission process, the gateway 115-a, antenna 110-a, atmospherics, the satellite, or other sources may cause signal degradation. However, the impact may differ at different frequencies, and may result in tilt, ripple, or varying phase shifts.

The gateway 115-a may later receive frequency response information from one or more of the subscriber terminals 130, and use the components specified above to compensate for the estimated frequency response. Therefore, it may be worthwhile to turn temporarily to an example of the processing performed at a subscriber terminal 130.

Figure 4:
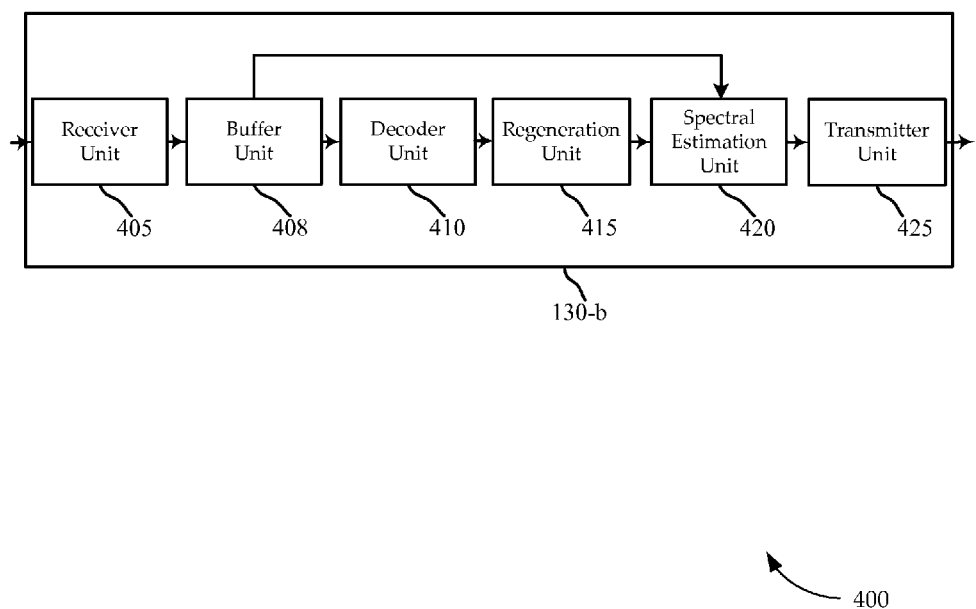
FIG. 4 is a block diagram of a subscriber terminal configured according to various embodiments of the invention.

Referring to FIG. 4, a block diagram 400 of a subscriber terminal 130-b is shown which may receive and process the transmitted signal sent from the gateway 115-a via a satellite. This may be a subscriber terminal 130 described with reference to FIG. 1. The subscriber terminal may be a terminal that is in use by a customer, or may be a dedicated frequency response estimation terminal controlled by a service provider. Other hybrid or multi-function terminals may be implemented, as well.

In the illustrated embodiment, the subscriber terminal 130-b includes a receiver unit 405, a buffer unit 408, a decoder unit 410, a regeneration unit 415, a spectral estimation unit 420, and a transmitter unit 425. These units of the subscriber terminal 130-b may, individually or collectively, be implemented in software. They may, in the alternative, be implemented with one or more Application Specific Integrated Circuits (ASICs) adapted to perform some or all of the applicable functions in hardware. The functions may, in the alternative, be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory in the subscriber terminal 130-b, formatted to be executed by one or more general or application-specific processors.

The receiver unit 405 may be configured to receive, digitize, and store the wireless signal transmitted from the gateway 115-a, and may further be configured to demodulate the digitized signal. The receiver unit 405 may also include an equalizer (not shown) to at least partially remove the frequency response due to the cabling from the subscriber terminal antenna 125 to the subscriber terminal 130.

The decoder unit 410 may be configured to decode a sequence of symbols of the digitized wireless signal to create a recovered set of data. The sequence of symbols may be a frame, or may be a series of continuous symbols. A CRC or other error check may be performed on the sequence to ensure that the data of interest is error free. The regeneration unit 415 may be configured to regenerate a version of the transmitted signal using the recovered set of data. The regeneration unit 415 may perform similar processing to the data processing unit 310 and transmitter unit 335 of the gateway 115-*a*, to produce a signal that corresponds to the ideal signal that should be generated at the output of the transmitter unit 335. Accordingly, for error-free recovered data, the regenerated version may be the same as an ideal version of the signal that should be output by the transmitter unit 335. This regenerated version may be referred to herein as a signal in "pre-transmission form."

The spectral estimation unit 420 may be configured to generate a first spectral estimate for the stored wireless signal making up the sequence of symbols. The spectral estimation unit 420 may also generate a second spectral estimate for the regenerated version. As noted above, the spectral estimates may each be obtained by using a fast Fourier transform to identify the signal amplitudes and/or phases at each of a number of analysis frequencies. The spectral estimation unit 420 may compare the first spectral estimate and the second spectral estimate to generate comparison data. The comparison data may include measurements of phase and/or amplitude differences between the first spectral estimate and the second spectral estimate. A transmitter unit 425 may be configured to transmit the comparison data and other data related to the received and/or generated signals.

The subscriber terminal 130-*b* may be configured to transmit the comparison data and other data related to the received and/or generated signals via the satellite, or via a landline (e.g., the network). The comparison and other data, or any subset thereof, may be transmitted to the gateway 115-*a*, or an intermediate device, for further processing. In one embodiment, the data may be transmitted in a pad portion of a data packet transmitted upstream. In another embodiment, the data may be transmitted only when there is a threshold level of inactivity in the channel, so as not to unnecessarily take up bandwidth. Thus, the comparison or other data may be assigned a range of low priority options for upstream transmission.

Turning back to FIG. 3, assume that the comparison or other data transmitted by the subscriber terminal 130-*b* is received by the receiver unit 305 of the gateway 115-*a*. As will be discussed below, spectral comparisons and other data may be received from a number of subscriber terminals 130. It is also worth noting that a gateway 115-*a* that is within a spot beam for one or more transmitted signals may (but need not) be configured to measure a frequency response itself. In some embodiments, a gateway 115-*a* may perform spectral estimations and also receive spectral estimation data from subscriber terminals (e.g., when a gateway 115-*a* is located within the areas covered by one or more spot beams, but not others). In still other embodiments, a gateway 115-*a* may receive and process comparison data from more that one subscriber terminal 130 in a given spot beam (perhaps averaging the results). Also, note that measurements for different spot beams may be separated, and separate processing may be performed for each spot beam.

Assume, for purposes of example, that the gateway 115-*a* receives comparison data from subscriber terminal 130-*b*. The inversion processing unit 320 may analyze and process the received comparison data, and control a filter unit 330 in the transmitter unit 335 to filter an outgoing signal to compensate for the frequency response (e.g., tilt, ripple, varied group delay, etc.). This filtering need not correct the entire response at one time, but may proceed in a step-by-step approach (e.g., using a method akin to a control loop to adaptively correct for the frequency response in a more stable, controlled manner). Thus, the inversion processing unit 320 may estimate a frequency response of channel using the comparison of spectral estimations, and generate filter data to produce an inverse filter effect. The received comparison data may be a series of ratios for a number of FFT analysis frequencies. The inversion processing unit may access a look-up table 325 and use the ratios to identify a set of filter coefficients to be used to perform the pre-distortion. The filter coefficients may be forwarded to the filter unit 330. The filter unit 330 may use the filter coefficients to filter a signal produced by a signal processing unit 315 of the transmitter unit 335, thereby pre-distorting the signal to counteract the frequency response. A variety of other pre-distortion techniques may be used, as well.

Consider, for example, a set of data produced by the data processing unit 310 of the gateway 115-*a*, to be broadcast downstream after the spectral estimations have been performed and compared. The set of data may be forwarded to the signal processing unit 315. The filter unit 330 may filter the later signal produced from the set of data, modifying the amplitude and/or phase of the spectral components based on the estimated frequency response. The frequency response may be a linear or nonlinear output.

It is worth noting that the gateway 115-*a* may receive a number of spectral estimate comparisons from different subscriber terminals 130. The pre-distortion may be based on an average of the spectral estimate comparisons. However, additional spectral estimate comparisons may be excluded when a signal to be filtered is not directed at such subscriber terminals 130.

Figure 5:
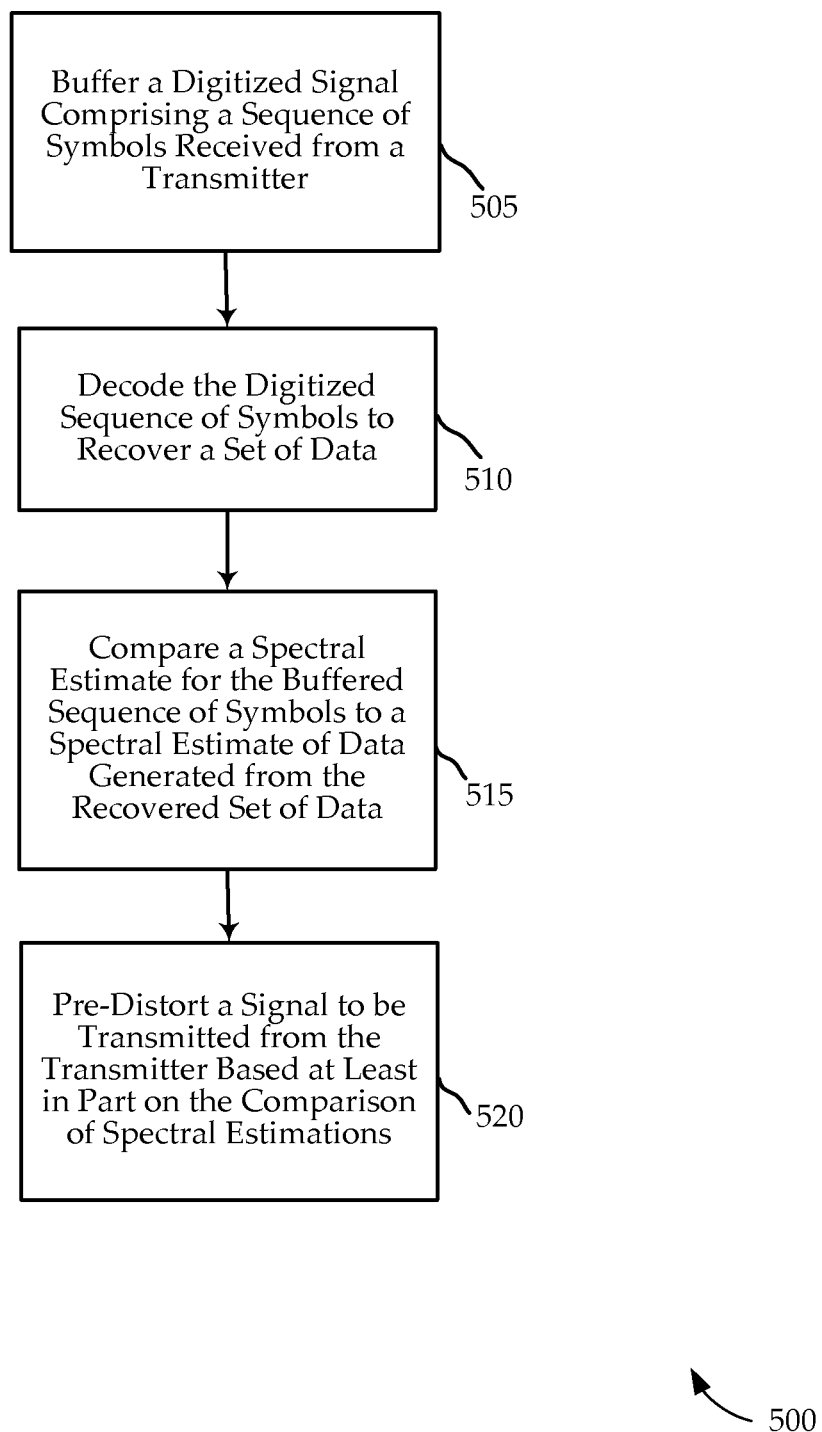
FIG. 5 is a flow diagram of a method of pre-distorting a signal based on a comparison of spectral estimations according to various embodiments of the invention.

Turning to FIG. 5, a flowchart is shown illustrating a method 500 for determining for pre-distorting a signal based on a comparison of spectral estimates. The method may be performed, for example, by any combination of the subscriber terminal 130 and/or gateway 115 described with reference to FIGS. 1, 3, or 4.

At block 505, a digitized signal including a sequence of symbols received from a transmitter is buffered. At block 510, the digitized sequence of symbols is decoded to recover a set of data. At block 515, a spectral estimate for the buffered sequence of symbols is compared to a spectral estimate of data generated from the recovered set of data. At block 520, a signal to be transmitted from the transmitter is pre-distorted based at least in part on the comparison of spectral estimations.

Figure 6:
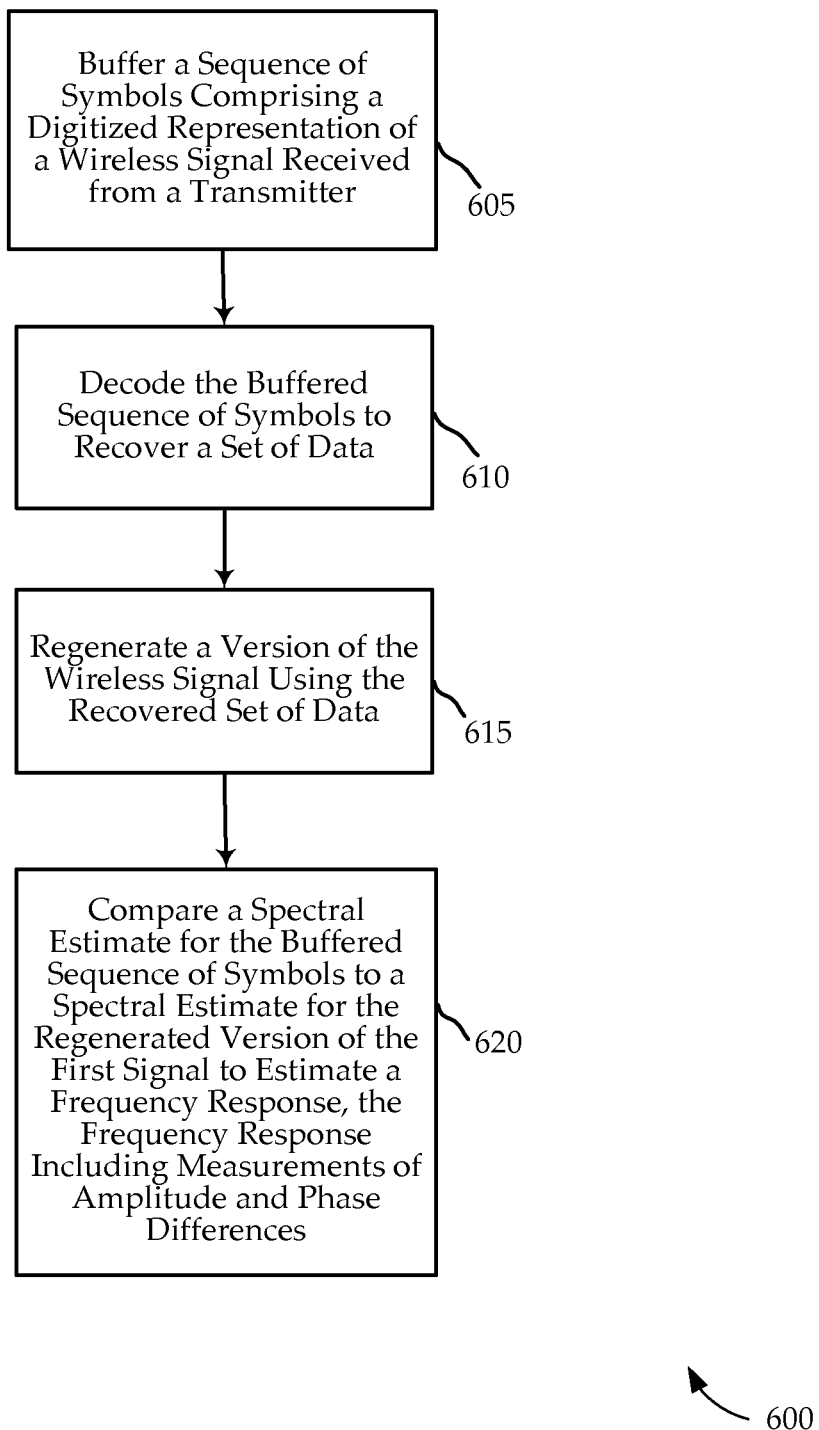
FIG. 6 is a flow diagram of a method of comparing spectral estimations using a regenerated signal according to various embodiments of the invention.

Referring to FIG. 6, a flowchart is shown illustrating a method 600 for comparing spectral estimates to determine a frequency response. The method may be performed, for example, by the subscriber terminal 130 or gateway 115 described with reference to FIGS. 1, 3, or 4.

At block 605, a digitized representation of a wireless signal received from a transmitter is buffered, the digitized representation made up of a sequence of symbols. At block 610, the buffered sequence of symbols is decoded to recover a set of data. At block 615, a version of the wireless signal is regenerated using the recovered set of data. At block 620, a spectral estimate for the buffered sequence of symbols is compared to a spectral estimate for the regenerated version of the first signal to estimate a frequency response, the frequency response including measurements of amplitude and phase differences.

Figure 7:
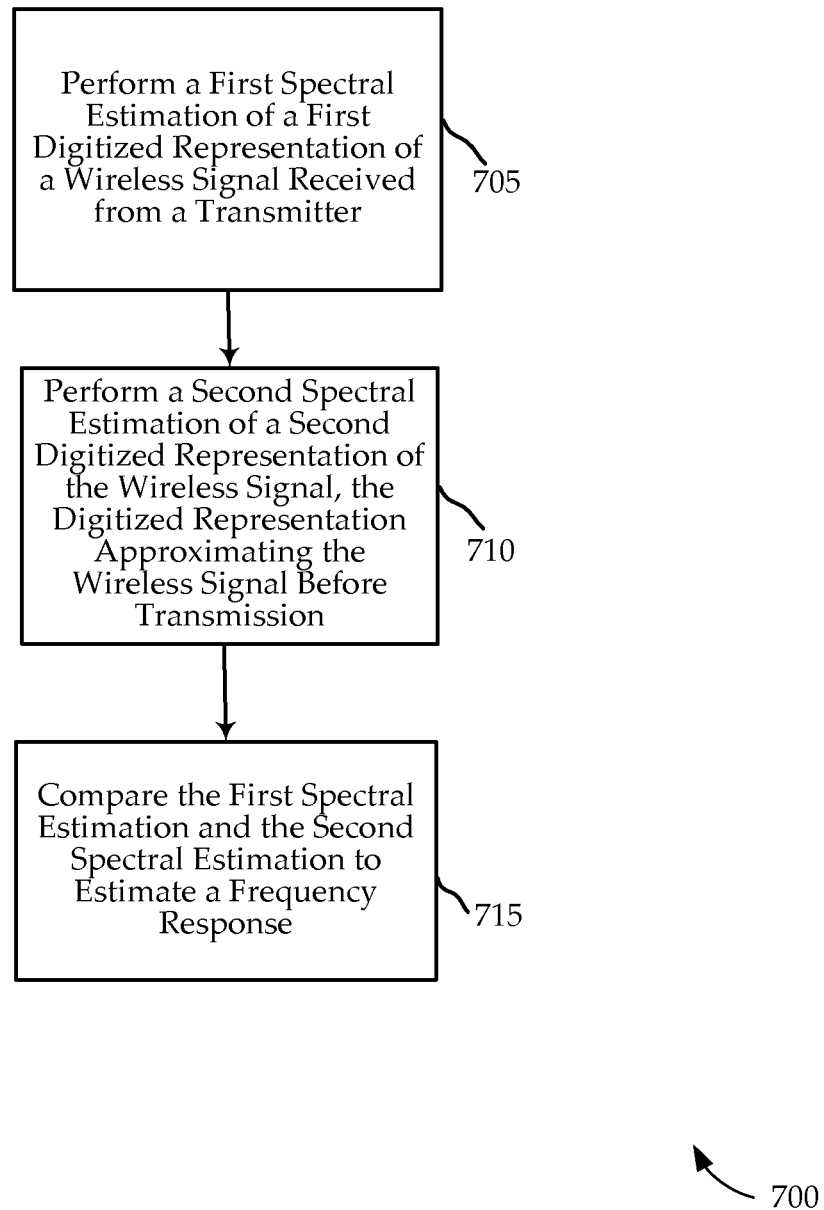
FIG. 7 is a flow diagram of a method of comparing spectral estimations according to various embodiments of the invention.

Referring next to FIG. 7, a flowchart is shown illustrating a method 700 for generating and comparing spectral estimates to determine a frequency response. The method may be performed, for example, by the subscriber terminal 130 or gateway 115 described with reference to FIGS. 1, 3, or 4.

At block 705, a first spectral estimation of a first digitized representation of a wireless signal received from a transmitter is performed. At block 710, a second spectral estimation is performed of a second digitized representation of the wireless signal, the second digitized representation approximating the signal before transmission from the transmitter. At block 715, the first spectral estimation is compared with the second spectral estimation to estimate a frequency response.

Figure 8:
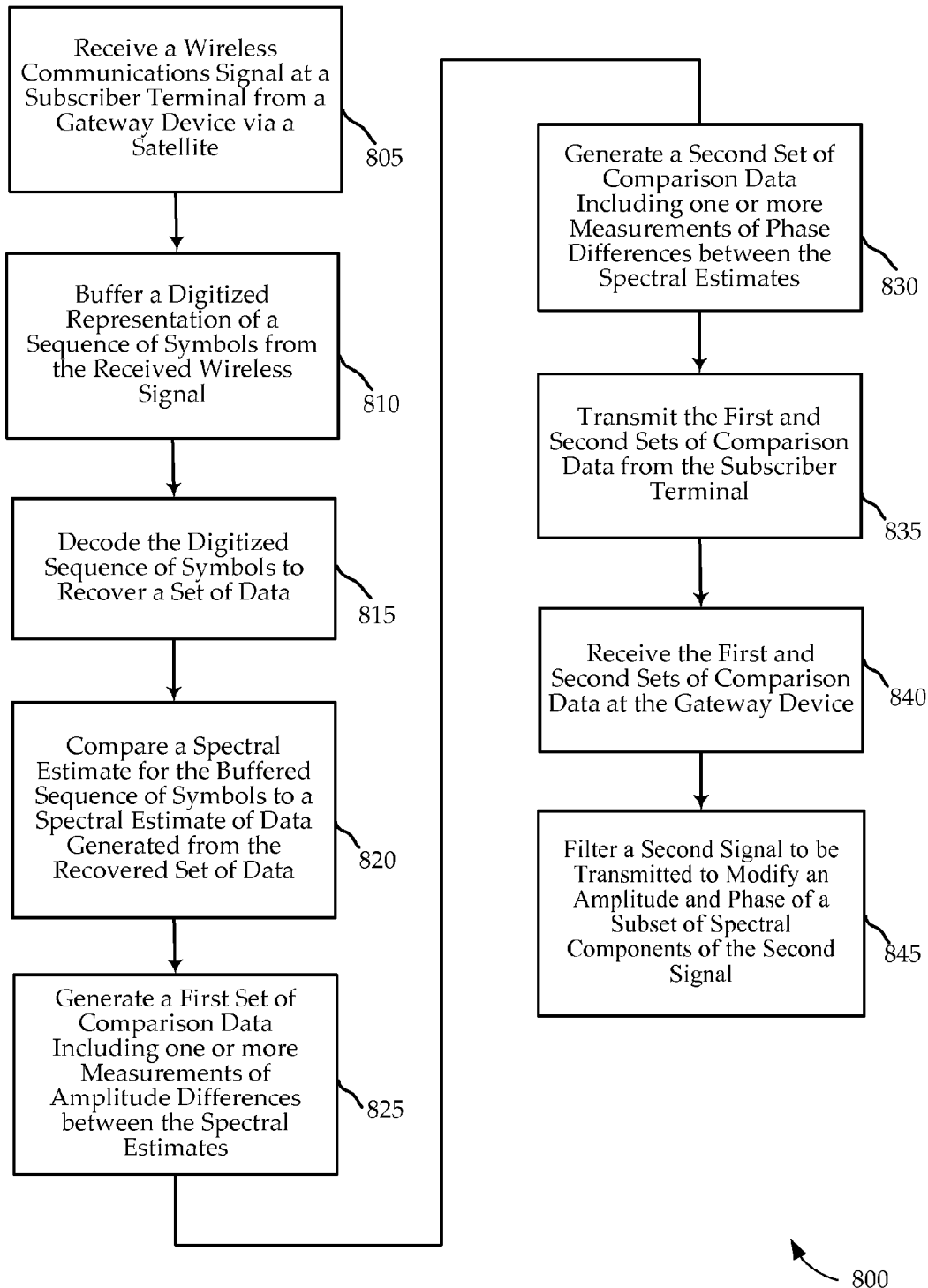
FIG. 8 is a flow diagram of a method of comparing spectral estimations in a satellite communications system according to various embodiments of the invention.

Referring next to FIG. 8, a flowchart is shown illustrating a method 800 for modifying a signal based on a comparison of spectral estimates. The method may be performed, for example, by the subscriber terminal 130 and gateway 115 of the system 100 described with reference to FIG. 1, or in other satellite communications systems.

At block 805, a wireless communications signal is received at a subscriber terminal from a gateway device via a satellite. At block 810, a digitized representation of the received signal is buffered, the digitized representation including a sequence of symbols received from a transmitter. At block 815, the digitized sequence of symbols is decoded to recover a set of data.

At block 820, a spectral estimate for the buffered sequence of symbols is compared to a spectral estimate of data generated from the recovered set of data. At block 825, a first set of comparison data is generated, including one or more measurements of amplitude differences between the spectral estimates. At block 830, a second set of comparison data is generated, including one or more measurements of phase differences between the spectral estimates. At block 835, the first and second sets of comparison data are transmitted from the subscriber terminal. At block 840, the first and second sets of comparison data are received at the gateway device. At block 845, a second signal to be transmitted from the gateway is filtered to modify an amplitude and phase of a subset of spectral components of the second signal, the modification based at least in part on the received comparison data.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figures.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for pre-distorting a signal, the system comprising:
a plurality of subscriber terminals located within a subscriber spot beam of a multi-beam satellite, each of the plurality of subscriber terminals configured to:
receive a first spot beam signal transmitted from a gateway device via the multi-beam satellite;
buffer a digitized representation of the first wireless spot beam signal comprising a sequence of symbols;
decode the sequence of symbols to recover a set of data;
regenerate a version of the transmitted first wireless spot beam signal from the recovered set of data;
compare a first spectral estimate for the buffered sequence of symbols to a second spectral estimate generated from the regenerated version of the first spot beam signal to create comparison data, the spectral estimates identifying signal amplitudes and phases at each of a plurality of analysis frequencies; and
transmit the comparison data to the gateway device; and
the gateway device, in communication with the plurality of subscriber terminals via the multi-beam satellite, and configured to:
receive the comparison data from of the plurality of subscriber terminals;
schedule transmissions to a first subset of subscriber terminals of the plurality of subscriber terminals in a second spot beam signal to be transmitted to the plurality of subscriber terminals; and
pre-distort the second spot beam signal based at least in part on the received comparison data from the first subset of subscriber terminals to compensate for frequency responses of signals transmitted to the first subset plurality of subscriber terminals, and wherein the pre-distortion is based on an average of received comparison data and excludes the received comparison data from a second subset of subscriber terminals of the plurality of subscriber terminals when the scheduled transmissions of the second spot beam signal are not directed at the second subset of subscriber terminals.

2. The system of claim 1, wherein each of the plurality of subscriber terminals are configured to generate comparison data comprising one or more measurements of amplitude differences between the first spectral estimate and the second spectral estimate.

3. The system of claim 1, wherein each of the plurality of subscriber terminals are configured to generate comparison data comprising one or more measurements of phase differences between the first spectral estimate and the second spectral estimate.

4. The system of claim 1, wherein the gateway device is configured to pre-distort the second spot beam signal by filtering the second spot beam signal to modify an amplitude and phase of a subset of spectral components of the second spot beam signal.

5. The system of claim 1, wherein each of the plurality of subscriber terminals are configured to transmit the comparison data to the gateway device via a landline.

6. The system of claim 1, wherein each of the plurality of subscriber terminals are configured to transmit the comparison data to the gateway device via the satellite in a pad portion of a data packet.

7. The system of claim 1, wherein the gateway device is not located within the subscriber spot beam.

8. A method of pre-distorting a signal at a gateway device in communication with a plurality of subscriber terminals located within a subscriber spot beam of a multi-beam satellite, the method comprising:
   receiving spectral comparison data from the plurality of subscriber terminals, wherein the spectral comparison data from each subscriber terminal of the plurality of subscriber terminals is generated by comparing a spectral estimate for a buffered digitized sequence of symbols of a first spot beam signal received at the each subscriber terminal to a spectral estimate of data generated from a regenerated version of the sequence of symbols, the regenerated version of the sequence of symbols regenerated from a recovered set of data generated by decoding the buffered digitized sequence of symbols, the spectral estimates identifying signal amplitudes and phases at each of a plurality of analysis frequencies;
   scheduling transmissions to a first subset of subscriber terminals of the plurality of subscriber terminals in a second wireless spot beam signal to be transmitted to the plurality of subscriber terminals; and
   pre-distorting the second spot beam signal based at least in part on the received spectral comparison data from the first subset of subscriber terminals to compensate for frequency responses of signals transmitted to the first subset of subscriber terminals, and wherein the pre-distorting is based on an average of received spectral comparison data and excludes the received spectral comparison data from a second subset of subscriber terminals of the plurality of subscriber terminals when the scheduled transmissions of the second spot beam signal are not directed at the second subset of subscriber terminals.

9. The method of claim 8, further comprising:
   generating the spectral estimate for the buffered digitized sequence of symbols; and
   generating the spectral estimate of data generated from the recovered set of data.

10. The method of claim 9, wherein, the spectral estimate for the buffered digitized sequence of symbols and the spectral estimate of data from the recovered set of data are each generated using a fast Fourier transform.

11. The method of claim 8, wherein the pre-distorting step comprises:
   filtering the second spot beam signal to be transmitted from the gateway device to modify an amplitude of at least a subset of spectral components of the second spot beam signal to be transmitted.

12. The method of claim 8, further comprising:
   estimating a frequency response of channels of the first spot beam using the comparison of spectral estimations.

13. The method of claim 12, further comprising:
   determining that the frequency response comprises a non-linear output; and
   identifying pre-distortion filter coefficients using a look-up table, wherein the identified pre-distortion filter coefficients are used in the pre-distorting step.

* * * * *

UNITED STATES PATENT AND TRADEMARK OFFICE
CERTIFICATE OF CORRECTION

PATENT NO. : 8,625,659 B2  
APPLICATION NO. : 11/972017  
DATED : January 7, 2014  
INVENTOR(S) : William H. Thesling Page 1 of 1

It is certified that error appears in the above-identified patent and that said Letters Patent is hereby corrected as shown below:

In the Claims

In claim 1, column 12, line 39, delete "wireless";
In claim 1, column 12, line 42, delete "wireless";
In claim 1, column 12, line 55, delete "of";
In claim 1, column 12, line 65, delete "plurality".

Signed and Sealed this
Twenty-sixth Day of August, 2014

Michelle K. Lee
*Deputy Director of the United States Patent and Trademark Office*